3,570,245
HYDRAULIC DRIVING SYSTEM WITH INERTIAL MOTOR

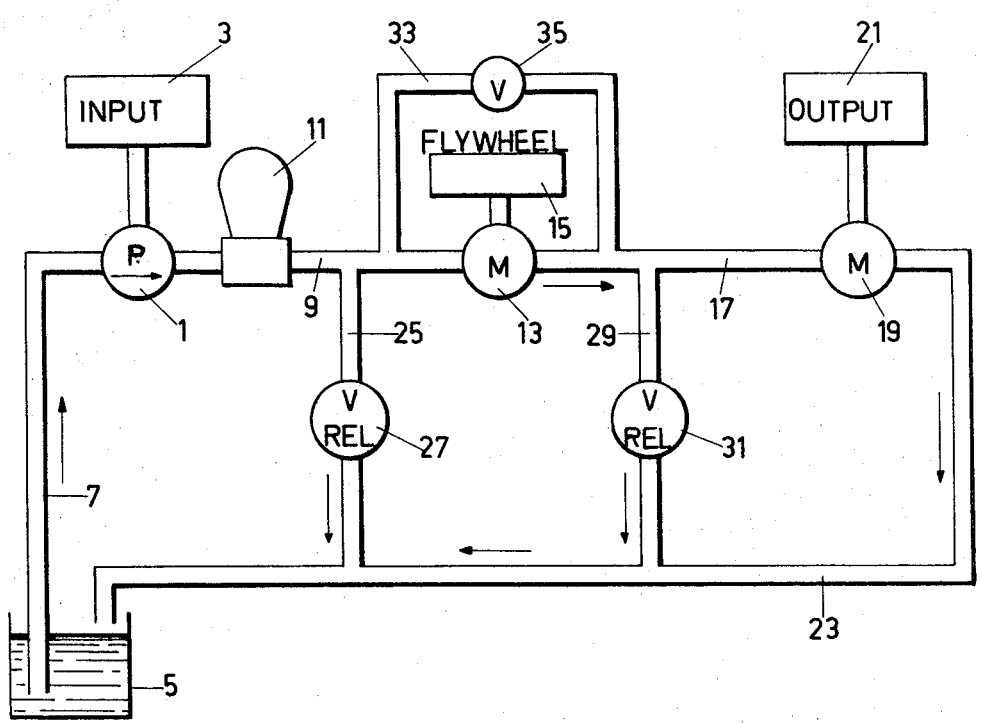

Franciscus Henricus van der Linde, Wassenaar, Netherlands, assignor to N.V. Industrieele Handelscombinatie Holland
Filed Sept. 15, 1969, Ser. No. 857,709
Claims priority, application Netherlands, Sept. 20, 1968, 68131514
Int. Cl. F15b 1/02, 11/16
U.S. Cl. 60—51                                      3 Claims

ABSTRACT OF THE DISCLOSURE

A hydraulic driving system has a pump and an output motor driven by the pump. A motor that drives a flywheel is disposed in fluid series between the pump and the output motor. Pressure relief bypasses are arranged between the pump and the flywheel motor, and also between the flywheel motor and the output motor.

---

The present invention relates to hydraulic driving systems of the type that include a driven displacement pump which drives a displacement motor protected against overload by a pressure relief valve.

The advantage of the systems of this type known heretofore is that the magnitude of the forces which may be exerted is limited by the pressure relief valve; while at the same time, excess loads cannot occur when sudden braking is required, because the inertia of the motor is low. On the other hand, the disadvantage of a low motor inertia is that when varying power is required with a substantially constant speed, these variations have to be provided for by over-dimensioning the pump drive so as to provide power for peak load requirements instead of the average load.

It is an object of the present invention to provide hydraulic driving systems in which both the pump and the output motor can have desirably low mass inertia.

It is another object of the present invention to provide hydraulic driving systems, which will be relatively simple and inexpensive to manufacture, and rugged and durable in use.

To this end, the present invention provides an auxiliary motor in series between the pump and the output motor. This auxiliary motor drives a flywheel. Pressure relief bypass conduits are provided between the pump and the flywheel motor, and also between the flywheel motor and the output motor.

If the pressure required for the drive is lower than the pressure delivered by the pump, the difference in pressure is accumulated as energy by the flywheel. But if the pressure required for the drive is higher than the pressure delivered by the pump, then the pressure deficit is supplied by the flywheel motor, the flywheel in this instance delivering energy. Thus momentary variations in work requirement are made up by the flywheel motor without calling on either the pump or the output motor.

The present invention is not to be confused with a hydraulic driving system in which the flywheel is coupled to the output motor itself. When sudden braking is required in this latter system, then braking can be effected only against the flywheel. In the present invention, by constrast, the corresponding strain on the output motor upon sudden braking is prevented by the pressure relief bypass conduit between the flywheel motor and the output motor.

A pressure accumulator is disposed in series between the pump and the flywheel motor in order to accommodate variations in volume of the hydraulic medium at a substantially constant pressure.

Preferably, the flywheel motor is a high-speed motor, so that the flywheel itself can be kept relatively physically small.

It will also be understood that so long as the fluid circuit relationships are maintained, the flywheel motor can be physically positioned almost anywhere desired, without special reference to the physical location of the pump or the output motor.

The accompanying drawing shows a rather schematic diagram of a hydraulic driving system according to the present invention. In the drawing, a pump 1 driven by an input 3 such as a motor receives hydraulic fluid from a sump 5 through an intake conduit 7. Pump 1 discharges elevated pressure hydraulic fluid through a conduit 9 past a pressure accumulator 11 and thence to a flywheel motor 13 which drives a flywheel 15. Hydraulic fluid continues through motor 13 and conduit 17 to an output motor 19 which drives the load or output 21 of the hydraulic system. Fluid then continues from motor 19 through return conduit 23, and back to sump 5.

A bypass conduit 25 connects conduit 9 with conduit 23 in bypass relationship, under the control of a pressure relief valve 27. Similarly, a bypass conduit 29 connects conduit 17 with return conduit 23 under the control of a pressure relief valve 31.

In order to render flywheel motor 13 inactive if desired, a bypass conduit 33 detours hydraulic fluid from conduit 9 to conduit 17, under the control of a selectively actuatable valve 35. Valve 35 will be normally closed; but when valve 35 is open, the flywheel motor 13 is inactivated.

The pump 1 and the motors 13 and 19 may be of the rotary type or other type if desired.

The pressure relief valve 27 is preferably set at the maximum rated pressure of pump 1. The pressure relief valve 31 is preferably set at the maximum rated pressure of the motor 13, or at the maximum rated pressure for the output 21. In that latter case, the opening pressure of pressure relief valve 31 would naturally be lower than if it were rated on motors 13 or 19.

In view of the foregoing disclosure, therefore, it will be evident that the initially recited objects of the present invention have been achieved.

Although the present invention has been described and illustrated in connection with a preferred embodiment, it is of course to be understood that modifications and variations may be resorted to without departing from the spirit of the invention, as those skilled in this art will readily understand.

What is claimed is:

1. A hydraulic driving system comprising a hydraulic circuit comprising a drive pump, a hydraulic motor that drives a flywheel, an output hydraulic motor, said flywheel motor being in hydraulic series between said pump and output motor, a bypass conduit between said pump and flywheel motor for bypassing said flywheel motor and said output motor, a bypass conduit between said flywheel motor and said output motor for bypassing said output motor, and pressure relief valve means in each of said bypass conduits.

2. A hydraulic driving system as claimed in claim 1, and a pressure accumulator in said circuit between said pump and said flywheel motor.

3. A hydraulic driving system as claimed in claim 1, and a valve-controlled bypass conduit for seletcively bypassing only said flywheel motor.

References Cited
UNITED STATES PATENTS

| | | | |
|---|---|---|---|
| 2,301,098 | 11/1942 | Twyman | 60—53X |
| 3,348,624 | 10/1967 | Just et al. | 60—53X |

FOREIGN PATENTS

| | | | |
|---|---|---|---|
| 121,879 | 8/1927 | Switzerland | 60—53 |
| 20,271 | 9/1907 | Great Britain | 60—53C |

EDGAR W. GEOGHEGAN, Primary Examiner

U.S. Cl. X.R.

60—53